May 19, 1959
C. O. LASSY
2,887,017
ANGLE PLATE ATTACHMENT
Filed April 3, 1956
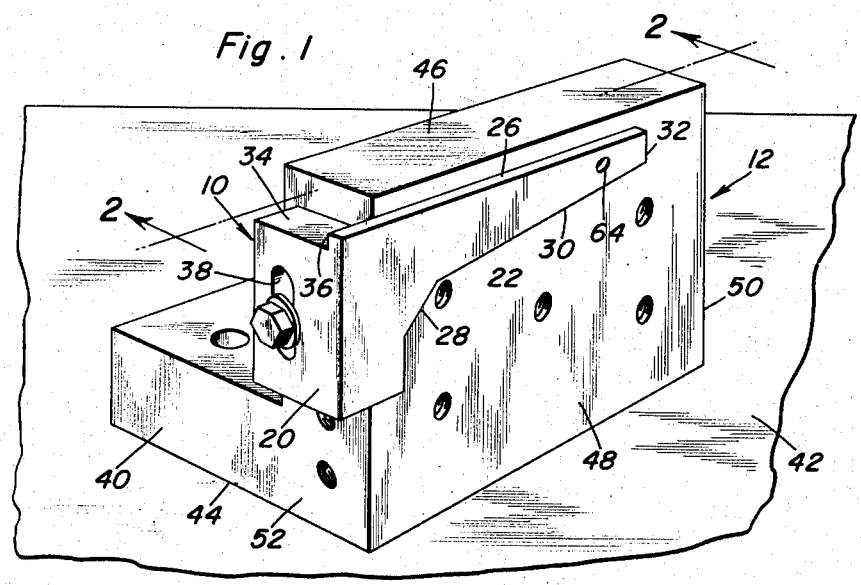
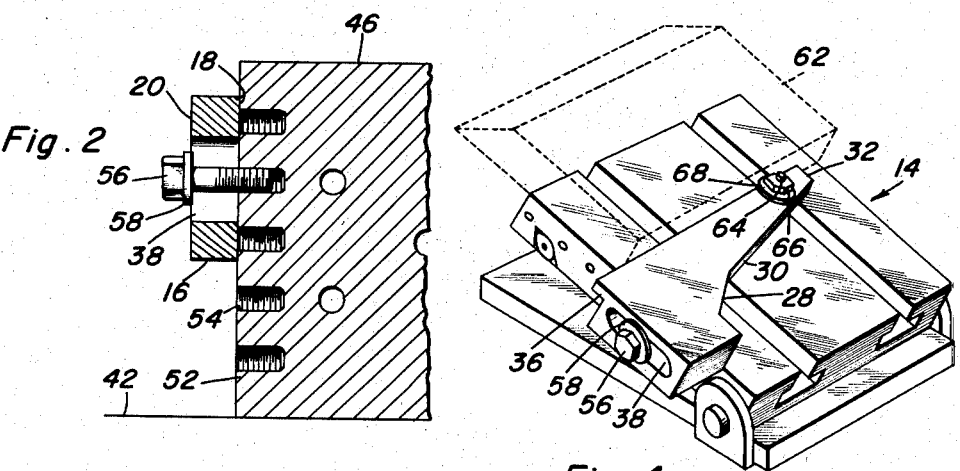
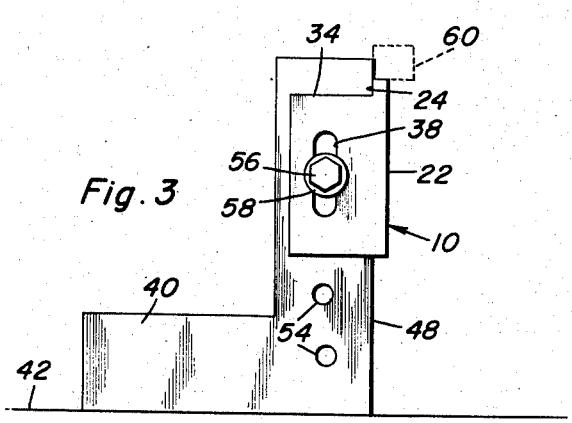
Carl Oscar Lassy
INVENTOR.
BY *(signatures)*
Attorneys

United States Patent Office 2,887,017
Patented May 19, 1959

2,887,017

ANGLE PLATE ATTACHMENT

Carl Oscar Lassy, Plainville, Conn.

Application April 3, 1956, Serial No. 575,903

5 Claims. (Cl. 90—59)

This invention relates in general to machine shop tools and more particularly to an angle plate or sine table attachment.

Heretofore when using an angle plate or a sine table for layout work, milling operations or grinding operations it was necessary to clamp a parallel to the angle plate or sine table for the purpose of locating the work piece on the face thereof. Aside from the fact that the job of accurately locating and clipping the parallel to the equipment was somewhat time consuming, clamps and accessories used to retain the parallel were oftentimes bulky and cumbersome and actually larger than the piece being worked on. It was also necessary when running a production job on duplicate pieces to check and recheck the setup in order to be assured that the parallel was in the same relative position at the beginning of each operation. Thus, a great deal of time was diverted to checking which could otherwise have been used in actual production work. Therefore, the primary object of this invention is to provide an attachment for an angle plate or sine table which is easily attached and accurately located in a relatively short period of time.

Another object of this invention is to provide an attachment which is relatively small and compact and thus does not interfere with the setup of the work piece or the operation of the cutter or grinding wheel.

A further object of this invention is to provide an attachment for an angle plate that is easily adjusted from one position to another and will remain in the adjusted position with a minimum amount of checking required by the operator in the use thereof.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of an angle plate shown on a work surface with the attachment of this invention shown attached to one of the upstanding edges;

Figure 2 is a fragmentary sectional view taken in vertical longitudinal section substantially along section line 2—2 of Figure 1, showing the details of vertical adjustability of the attachment, with parts of the angle plate broken away;

Figure 3 is a side elevation of the left end of the angle plate of Figure 1, with the attachment in position and a work piece shown in dotted lines; and Figure 4 is a perspective view of a sine plate with the attachment clamped in position and a work piece positioned on the sine plate by the attachment, with the work piece shown in dotted lines.

Referring now to the drawing in detail it will be seen that the attachment which is referred to in general by the reference numeral 10 may be attached to an angle plate, referred to in general by the reference numeral 12, or a sine plate, which is referred to in general by the reference numeral 14.

The attachment 10 consists of a body 16 which is rectangular in configuration and has an inner planar surface 18, and an outer end surface 20 parallel to the inner surface 18. Formed integral with the body 16 and extending outward therefrom at a 90° angle there is an arm 22 having an inner planar surface 24, which is perpendicular to the inner planar surface 18 of the body 16. The arm 22 has an upper edge 26 which is perpendicular to the inner surface 18 of the body 16. The arm 22 is formed at the lower edge thereof at an angular relation thus forming edges 28 and 30. The arm 22 is thus tapered and becomes progressively smaller in cross-section toward an outer end 32. An upper surface 34 of the body 16 is formed slightly below the upper edge 26 of the arm 22 thus forming a step 36 between the surface 34 and 26. A vertically elongated aperture 38 is formed in the body 16, which extends perpendicularly through the faces 18 and 20 and is elongated vertically for vertical adjustment of the attachment upon the end face of the angle plate 12.

The angle plate 12 has a horizontally disposed base 40 adapted to be placed on a work surface 42. The base 40 has a lower surface 44, which is normally in a horizontal position in close face to face relation to the work surface 42 and extending vertically upward from one edge of the base 40, there is provided a portion 46 having an outer surface 48. The angle plate 12 terminates on each side thereof in end surfaces 50 and 52. The end surface 52 is provided with a plurality of threaded apertures 54.

When placing the attachment 10 on the angle plate 12 the inner face 18 is disposed in close face to face relation to the end face 52 and the inner surface 24 of the arm 22 in close face to face relation with the surface 48. When the attachment is thus placed on the angle plate the elongated aperture 38 is in alignment with at least one of the threaded apertures 54. A bolt 56, having a washer 58 thereon, is inserted through the aperture 38 and threadedly engaged in an aperture 54 to retain the attachment, after the proper height adjustment, in an immovable position on the angle plate.

As is best seen in Figure 3 a work piece 60 may then be placed on the upper edge 26 of the arm 22 and retained thereon by means of finger pressure if layout work is being performed on the work piece or by suitable clamps (not shown) if milling or grinding operations are being performed on the work piece.

As is best seen in Figure 4, the attachment may also be used in connection with the sine plate 14 for the performance of work on an angular face of a work piece 62. It should be noted that the arm 22 is provided with an aperture 63 near the outer extremity 32 thereof for receiving a T-slot bolt 64, which is threaded and receives a nut 66 with a washer 68 thereunder. The T-slot bolt, nut and washer add to the rigidity of the arm 22 and thus prevent accidental displacement of the arm 22 when work is being performed on the work piece 62. Although not shown, it should be understood that suitable clamps would be provided to retain the work piece 62 in an immovable position while work is being performed thereon.

It should be further understood that all surfaces of the attachment 10, the angle plate 12 and the sine plate 14 are hardened and ground to tolerances commensurate with the type of work being performed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for angle plates and sine tables comprising a metal body having a plane vertical inner face for sliding engagement upon the vertical end face of an angle plate and an integral arm extending horizontally from said body and having an inner vertical plane face for sliding engagement upon the vertical side face of an angle plate, the vertical inner faces of said body and arm being perpendicular to each other for embracing and receiving therein the vertically extending edge and corner of an angle plate, said arm having its top surface horizontal, planar and vertically spaced above the top surface of said body whereby to provide a work engaging surface, said body having a vertically elongated opening therethrough opening upon said body inner face, means extending through said opening for securing said body to the end face of said angle plate in vertically adjusted position thereon.

2. The combination of claim 1 wherein said arm is of varying vertical thickness throughout its horizontal extent having its maximum vertical thickness adjacent said body and tapering to its minimum thickness at its outer end which is remote from said body.

3. The combination of claim 2 including an aperture extending through said arm at its outer end and opening upon the arm inner face for receiving a fastener.

4. In combination with a precision angle plate having a horizontal base and a vertical member provided with a work surface, said vertical member having vertical planar perpendicularly disposed end and side faces meeting in a vertical edge, an attachment comprising a metal body having an integral horizontal arm projecting from said body, said body and arm each having planar vertical perpendicular inner faces having respective sliding engagement with said end and side faces, said inner faces embracing therebetween said vertical edge and lying upon said end and side faces, said body and arm having horizontal plane top surfaces with the top surface of said arm lying in vertically spaced relation above that of said body whereby to provide a work supporting surface, said vertical end face having a series of vertically spaced threaded apertures, said body having a vertically elongated slot extending therethrough and opening upon its inner face, a fastening bolt extending through said slot and engageable in one of said apertures whereby to secure the block and arm upon said angle plate in vertically adjusted position thereon.

5. The combination of claim 4 wherein said arm is of progressive decreasing vertical thickness from said body to said outer end.

References Cited in the file of this patent
UNITED STATES PATENTS

| | | |
|---|---|---|
| 1,308,451 | Schachat | July 1, 1919 |
| 2,106,288 | Tautz | Jan. 25, 1938 |
| 2,111,299 | Robbins | Mar. 15, 1938 |
| 2,366,385 | Comfort | Jan. 2, 1945 |